United States Patent [19]
Marquardt, Jr. et al.

[11] Patent Number: 6,160,787
[45] Date of Patent: Dec. 12, 2000

[54] MULTIPLE LAYER OPTICAL RECORDING MEDIUM FOR USE WITH TWO DIFFERENT WAVELENGTH LASER BEAMS

[75] Inventors: Richard Marquardt, Jr., Clarks Green, Pa.; Christopher Cookson, Los Angeles, Calif.; Anthony Pietrzykoski, Plains, Pa.; John L. Orehotsky, Dallas, Pa.; Deborah H. Carey, Wyoming, Pa.; Howard Price, Norfolk, Va.; Daniel M. Pindzola, Berwyn, Pa.

[73] Assignee: WEA Manufacturing, Inc., Olyphant, Pa.

[21] Appl. No.: 08/782,555

[22] Filed: Jan. 10, 1997

Related U.S. Application Data

[60] Provisional application No. 60/009,693, Jan. 11, 1996.
[51] Int. Cl.[7] .................................................. G11B 7/24
[52] U.S. Cl. ......................... 369/275.1; 369/281; 369/94
[58] Field of Search ................... 369/275.1, 94, 369/275.2, 275.3, 275.4, 281, 283, 286; 428/64.1, 64.4

[56] References Cited

U.S. PATENT DOCUMENTS

| | | | |
|---|---|---|---|
| 4,450,553 | 5/1984 | Holster et al. | 369/275.1 |
| 5,485,452 | 1/1996 | Maeda | 369/275.1 |
| 5,608,715 | 3/1997 | Yokogawa et al. | 369/275.1 |
| 5,627,814 | 5/1997 | Lee | 369/94 |
| 5,640,382 | 6/1997 | Florczak et al. | 369/275.1 |
| 5,645,908 | 7/1997 | Shin | 369/275.1 |
| 5,689,497 | 11/1997 | Wilting et al. | 369/275.1 |
| 5,828,648 | 10/1998 | Takasu et al. | 369/275.1 |
| 5,878,018 | 3/1999 | Moriya et al. | 369/275.1 |

*Primary Examiner*—Tan Dinh
*Attorney, Agent, or Firm*—Gottlieb, Rackman & Reisman, P.C.

[57] ABSTRACT

A double sided (or higher multiple sided) data storing compact disc for optically recorded data has data surfaces that are separated by a thin film of wavelength selective material that passes light of one frequency and reflects light of a second (or multiple) frequency. The thin film either passively relies upon the inherent interference between light signals reflected from its upper and lower surfaces or is an active material that reflects light of one frequency and transmits light of a second frequency. A further aspect of the present invention is the method for the manufacture of such a multi-surfaced disc.

4 Claims, 3 Drawing Sheets

ORGANIC DYES THAT ARE TRANSMISSIVE AT 780nm AND REFLECTIVE AT 650 nm

| CLASS OF DYE | COMPOUND STRUCTURE |
|---|---|
| ANTHRAQUINONES (D & C GREEN 6: CROMPTON & KNOWLES) (SOLVENT GREEN 6: PYLAM) |  |
| CHLORANTINE FAST BLUE 4GL |  |
| DIPHENYLMETHINE DYES (MICHLER'S HYDROL) |  | ism
MULTIPLE LAYER OPTICAL RECORDING MEDIUM FOR USE WITH TWO DIFFERENT WAVELENGTH LASER BEAMS This application is benefit under Title 35 USC 119(e) of provisional application No. 60/009,693, filed Jan. 11, 1996.

FIELD OF THE INVENTION

This invention relates to optical storage media, specifically compact discs that contain more than one data recording surface readable from a single side of the disc.

BACKGROUND OF THE INVENTION

Compact discs are typically composite objects having a series of pits impressed into a plastic surface, usually during an injection molding process. These pits and the lands between them are arranged in a spiral pattern that can be tracked by a pickup laser beam which advances slowly along a radius of the disc while the disc is spun about an axis through the center of the disc. The pit/land surface is coated with a thin reflective metal layer. The pickup laser beam is reflected from the metal layer coating the pits and lands and the reflection is analyzed to observe the change in reflection intensity associated with a transition from a land to a pit or vice versa. To enhance the change in reflection intensity the wavelength of light is chosen to cause interference when the laser illuminates a pit. The interference occurs between laser light reflected from the bottom of a pit and light reflected from the areas outside the pits struck by the laser light. Therefore the wavelength of light is not chosen arbitrarily, but is typically related to the depth of the pits. An infrared wavelength of 780–790 nm in air (503–510 nm in polycarbonate where the index of refraction n=1.55) is often used. By detecting the change in reflection intensity, the length of the pit and or land as it passes under the pickup laser is sensed by photocells and is then interpreted by the CD player's electronics. Data is encoded onto the compact disc as varying lengths of the pits and lands. The data may be analog or digital data. For example a voltage level may correspond to a pit length in an analogue recording, or the length of the pits/lands may represent strings of 0's or 1's for the recording of digital data.

The amount of data that can be encoded onto a disc is limited by the density of pits and lands that can be accurately reproduced, for example by an injection molding procedure, and that can be accurately read by a photocell sensor system. Some error rate can be tolerated if the data is placed on the disc in a redundant format that allows errors to be recognized and corrected. Thus as the pits and lands are decreased in size it becomes necessary as a practical matter to provide greater redundancy in the data until a limit is reached in the amount of data that can be stored on the disc surface.

The conventional audio compact disc stored data that was readable from only one side, the other side being used to display a label over the surface of the disc. It has been known to utilize both surfaces of the compact disc to store data, thereby doubling the amount of data that can be stored. Double sided discs have been made by fabricated two half thickness compact discs and bonding them back to back. One drawback of such a product is that the disc must be removed from the player and inverted if there is only one pickup laser reading head within the player, or multiple reading heads must be provided. The present invention avoids the need for either multiple reading heads or disc inversion.

BRIEF DESCRIPTION OF THE INVENTION

A CD format using a reading beam of shorter than conventional wavelength (650 nm v. 780 nm) called DVD has been proposed. Discs for this new format would not be readable by conventional CD players. The present invention provides a way to have an optical disc medium readable by both (conventional) CD and DVD players.

The present invention provides a double surfaced (or higher multiple surfaced) data storing compact disc for optically recorded data. The data surfaces (one for convention CD, one for DVD) are separated by a thin film of wavelength sensitive material that passes light of one frequency and reflects light of a second (or multiple) frequency. The thin film may provide this effect by passively relying upon the inherent interference between light signals reflected from the upper and lower surfaces of the film. In another embodiment the thin film may be fabricated from an active material that receives light of one frequency and depending upon that frequency reemits light of a second frequency. Filtering optics can then distinguish the light reflected from the data surfaces. In this manner, by the proper selection of the wavelength of the illuminating light the information stored in the pits and lands of the appropriate surface is selectively recovered from the compact disc.

A further aspect of the present invention is the method for the manufacture of such a multi-surfaced disc. The invention is a combination of the technologies of compact disc manufacture and thin film technology.

One advantage of the present invention is greater information storage on a single disc. A second advantage is that by providing a disc with two different data formats it may allow backwards compatibility during introduction of a new DVD format.

DETAILED DESCRIPTION OF A PREFERRED EMBODIMENT

Figure 1:
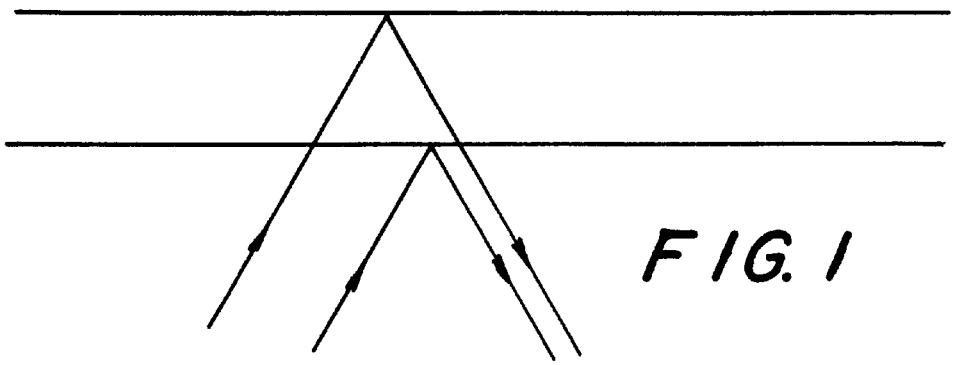
FIG. 1 is a schematic representation of the reflection of light from a thin film.

FIG. 1 shows the reflection of parallel rays of light from two surfaces of a thin film. The light is shown in non-normal incidence for purposes of clarity, but in practice the light is normally incident on the film. The phase change of the ray that takes the longer path by reflection from the upper surface is $2\pi(2d_i/\lambda_i)+([\pi])$, where the $[\pi]$ term is included if the light is reflected from a surface having a lesser index of refraction than the material through which it is propagating. The index i identifies the layer where the reflection takes place in the event that there is more than one such layer. When the phase change is an odd multiple of $\pi$ relative to the ray reflected from the lower surface, there is destructive interference and the intensity of the light reflected from the thin film as a whole is reduced and the wave propagates through the thin film. In this manner any thin film of proper thickness and index of refraction has wavelength selective properties. In one aspect of the present invention a thin film coating is used to select between the different wavelengths of the pickup lasers.

Figure 2:
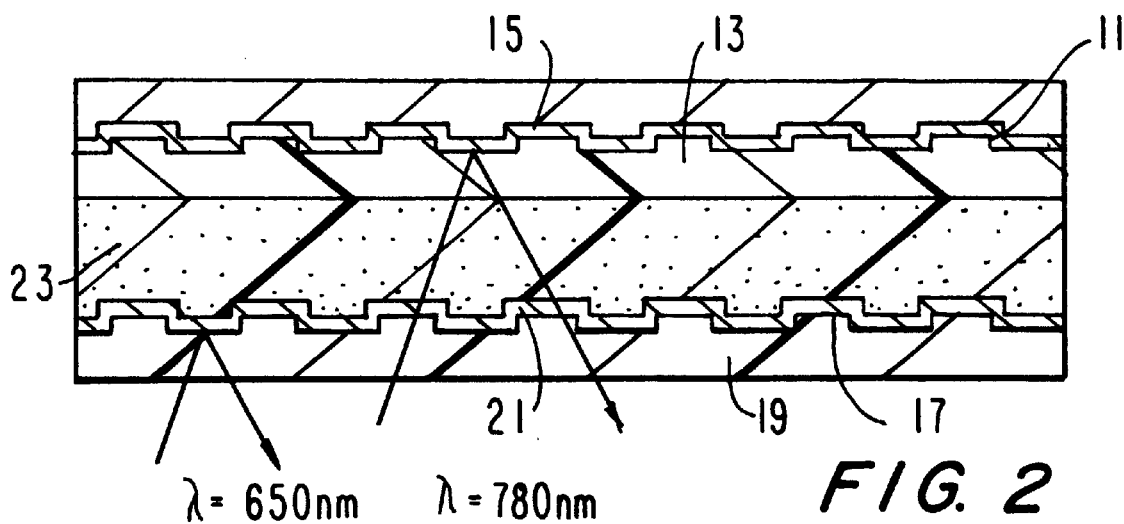
FIG. 2 is a side cut away view showing the data recording surfaces of the present invention.
Figure 3:
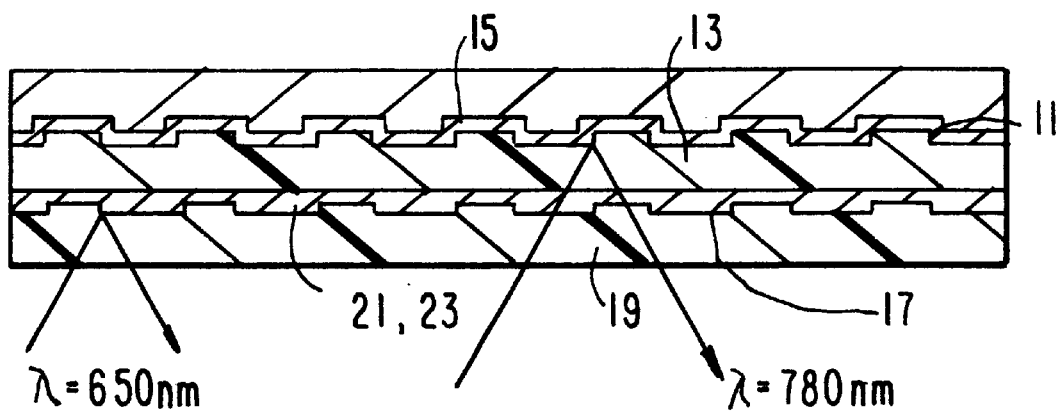
FIG. 3 is a further embodiment in which the wavelength selectable thin film comprises the adhesive bonding the CD and DVD surfaces together.

FIG. 2 depicts a cross section (not to scale) through a portion of the compact disc of the present invention. The pits and lands are present on two levels. The upper level pits and lands 11 are formed on a PCV or polycarbonate vinyl flat surface termed the CD 13, because of its resemblance to conventional audio or CD-ROM surfaces. It is coated with a metallization layer 15 to enhance the reflectivity of light entering from below. The depths of the pits on the CD layer are such as to enhance interference effects when 780 nm radiation is incident on the pit/land surface. The lower level pits and lands 17 are formed on a PCV flat surface termed the DVD 19. The lower level pits and lands are coated with a wavelength selective reflection layer 21, also referred to as a thin film layer, thereby completing the formation of the DVD. Both the DVD and the CD layers have preferred thicknesses of 0.6 mm. The thin film layer 21 is preferably a silicon carbide (SiC n=2.7), oxide or nitride deposited by sputtering onto the appropriate surface to a thickness of approximately 140 nm. The two layers are adhered together by an bonding layer 23, which may be a transmissive photo polymer layer having a thickness of 30–40$\mu$. In an alternative embodiment of the present invention depicted in FIG. 3, the adhesive material may itself constitute the wavelength selective thin film. The thin film layer 21 is reflective to wavelengths of 650 nm and transmissive to infrared wavelengths of 780 nm. In the preferred embodiment the wavelength selection is a function of the thin film nature of the sputtered material and not any particular active feature of the silicon material.

In an alternative embodiment the DVD layer 19 comprises a dye polymer layer 21, which is over 85% transmissive to 780 nm light and over 15% reflective to 650 nm light. In both embodiments, the CD layer is conventionally coated (metallized) for maximum reflectivity of over 90%. The relative efficiency of the reflectivity of the 780 nm material is 70%. The data density of the DVD layer may be reduced to 4.5 gigabytes to assure adequate signal to noise ratio.

This application contains three alternative embodiments of the invention using active materials. These are the use of an organic dye, the use of a semiconductor having a large index of refraction for reflectivity, and the use of a liquid crystal polymer, and the use of an emission/transmission design.

Figure 4:
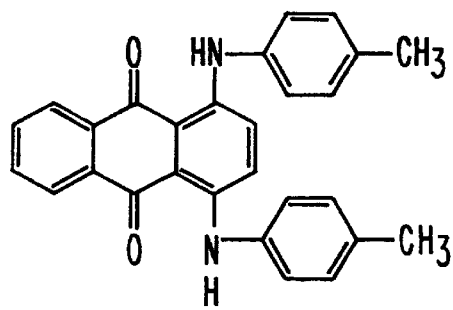
FIG. 4 is a structural diagram of a preferred thin film material.
Figure 4:
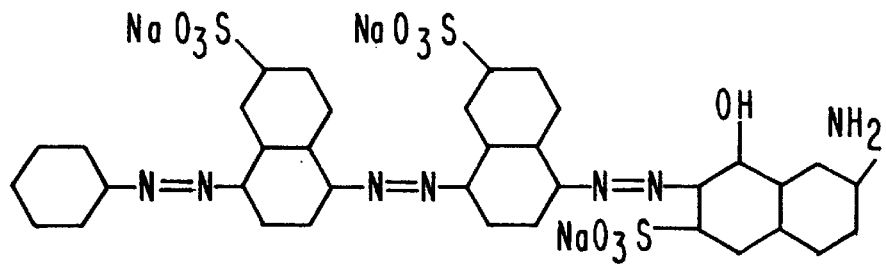
Figure 4:
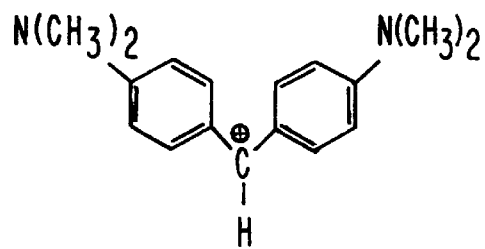

In a first alternative embodiment, a thin (i.e., molecular) layer of an organic dye having the desired reflectivity at 650 nm and transmissivity at 780 nm is place on the surface of the polycarbonate disc. The two polycarbonate discs are then bonded together with an aliphatic hydrocarbon wax, strengthened by a small amount of ethylene vinyl acetate (EVA). These polymers are transmissive to 780 nm. The system is easily adaptable to large-scale manufacturing. The dye may be selected from a group that are transmissive at 780 nm and reflective at 650 nm. This dyes include the anthraquinones, such as D&C green 6 (1,4-di(p-toluidine) anthraquinone) available from Crompton & Knowles, and solvent green 6, available from Pylam. Other useable dyes are Chlorantine Fast Blue 4GL and diphenylmethine dyes such as Michler's hydrol. The structural diagrams for these preferred dyes are shown in FIG. 4.

To apply the D&C green 6 dye onto the surface of a polycarbonate disc the dye is dissolved in USP No. 10 mineral oil and then spin-cast onto the surface of the disc prior to adding the adhesive. The mineral oil is preferred because it is transparent at the wavelengths of interest and will flow evenly into the imprinted grooves of the disc due to its low viscosity.

Reflection occurs only at the interface between the dye and the polycarbonate disc, and therefore, only a uniform molecular layer is necessary for this embodiment to work. 5–10 $\mu$m of the dye is sufficient to cover the surface of the disc. An alternative technique to spin-casting a thin layer of the dye onto the disc is to use a solvent such as butane that could be flashed evaporated. In this process, rapid heating of the solvent would leave the dye behind on the surface of the disc.

To bond the discs a strong adhesive for polycarbonate is used such as pure paraffin or micro-crystalline waxes. These have a melting temperature around 80° C. and readily "wet" the surface of polycarbonate. In addition to their adhesive strengths, any residual hydrocarbon solvent used for dissolving the dye would be absorbed by these waxes and would concentrate the D&C green 6 into a very compact reflective layer at the surface of the disc. A small percentage of ethylene vinyl acetate (EVA) (10%) should be added to the paraffin wax melt, to increase the high temperature tensile strength and low temperature flexibility of the product. Adding more than 10% of EVA to the paraffin wax may cause cloud point dispersion of the light beam, which might diminish the signal intensity.

In a second preferred embodiment of the present invention a semiconductor may be used to bring about the desired wavelength selectivity. The preferred semiconductor is a $(GaAs)_{0.6}(GaP)_{0.4}$ stoichiometric III-V semiconductor. At 500 nm, the index of refraction of this material is about 3.5, so the reflectivity is measurable at 650 nm. The index of refraction of the polycarbonate is 1.5. The reflectivity at an interface is calculate from $R=(n_2-n_1/n_2+n_1)^2$. Thus at a $(GaAs)_{0.6}(GaP)_{0.4}$ /air interface the reflectivity is $(3.5-1)^2/(3.5+1)^2=30\%$. At a $(GaAs)_{0.6}(GaP)_{0.4}$/ polycarbonate interface the reflectivity is $R=(3.5-1.5)^2/(3.5+1.5)^2=16\%$. Because of the reflection at the polycarbonate air interface a total reflectivity of about 10% is expected in the CD/DVD technology with this material as the filter. This 10% reflectivity represents an attenuated signal, but is expected to be serviceable for the technology provided the incident laser power is sufficiently intense, the optical detection system is sufficiently sensitive and the remaining 90% of the incident 650 nm radiation is accommodated by absorption effects and not transmissivity.

The CD/DVD technology requires a material with a very sharp change in the transmissivity at about 700 nm. This requires a change of the absorption coefficient by orders of magnitude in the immediate vicinity of 700 nm. This is satisfied by semiconducting materials with band gap energies of approximately 1.7 eV. The preferred material, $(GaAs)_{0.6}(GaP)_{0.4}$ stoichiometric II-V semiconductor, has this desired band gap energy. The sharpness of the transmissivity has been evaluated from the wavelength dependence of the absorption coefficient, which shows that the absorption coefficient can change by about 5 orders of magnitude over a 100 nm wavelength band centered about 700 nm. At 650 nm the internal transmissivity is negligibly small. At 780 nm the internal transmissivity is 100%. The reflectivity at 780 nm is in excess of 10%, since the refractive index generally decreases with increasing wavelength.

To achieve larger reflectivity than 10% at 650 nm, a very thin (about 10 nm) partially reflective chromium layer can be deposited on the polycarbonate prior to depositing the 40 $\mu$m GaAsP layer. Increasing the reflectivity to specifications at 650 nm with a partially transmissive chromium layer will have an attenuating effect on the transmissive behavior at 780 nm. A beneficial side-effect of employing chromium as a reflectivity agent is that it may also be strong bonding agent between the polycarbonate and the GaAsP.

Other materials having a band gap energy at 1.7 eV is the II-VI binary compound CdSe. However its index of refraction is about 2.5, making it less suitable. Several ternary and quaternary III-V compound semiconductors exist whose binary compound components are mutually soluble in each other and whose compositions can be adjusted to achieve a 1.7 EV band gap energy. The ternary $(GaAs)_{1-x}(AlAs)_x$ compounds represent alternative possibilities to the preferred GaAsP system.

A still further preferred embodiment employs a liquid crystal polymer (LCP). LCPs are polymers whose optical properties are controlled by the molecular structure and the post-reactor processing involving thermal, mechanical and electrical energy. The optical properties are also changed by processing the polymer by itself or with other polymers.

In the prior art, LCP's have been used for a wide variety of optical devices. These include switchable optical recording medium, gas flow optical indicator, light modulators, shutters and valves, amplitude intensifying optical filters, wave plate for 1054 nm laser, optical bandpass filter, multipage optical display as well as other applications. LCPs have been applied as films and as dispersions in other polymers including polycarbonate. The composite is a polymer dispersed liquid crystal or PDLC. The PDLC contains "droplets" of the LCP. The size, pitch and spatial orientation of these droplets provide yet another way of controlling the optical properties of the polymer- LCP composite.

A copolyamide of nylon 6 and nylon 66 with the trade name Utramid is supplied by BASF. This contains no chopped glass reinforcing fibers, so it is useful for optical applications.

The general method of dispensing LCPs in host polymers is by extrusion. Such dispersion can be done prior to and independent of the present manufacturing line.

Figure 5:
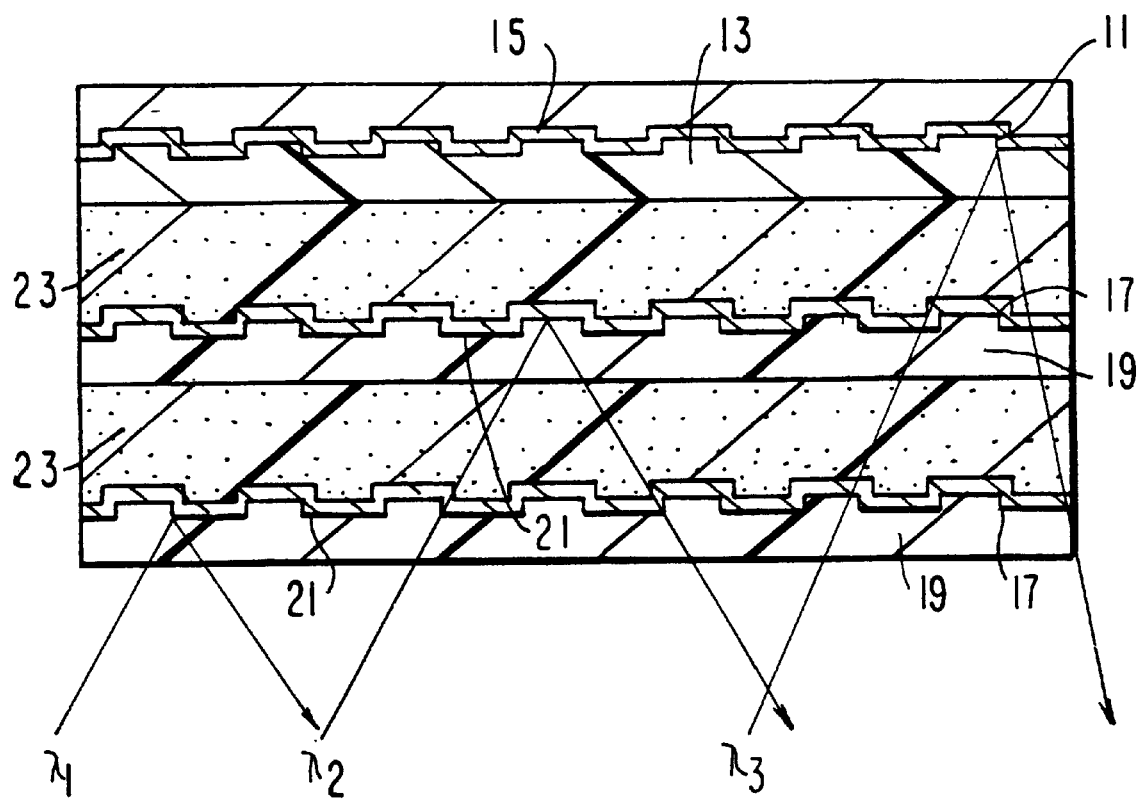
FIG. 5 is a schematic view of an alternative embodiment of the present invention employing multiple data surfaces.

A still further preferred embodiment is shown in FIG. 5. There, a multilayered example of the present invention is depicted in which there are more that two data recording surfaces.

A particular utility for this invention is to provide a single compact disc that is readable both on a conventional CD player (where the data is read using the longer wavelength light that passes through the DVD layer) and on a DVD format player. The DVD player requires a thinner plastic layer that allows the DVD data surface to be closer to the pickup laser. This is accomplished by the present invention where, as shown in FIG. 2, the DVD layer is closer to the pickup optics. The CD player, which can tolerate a greater displacement between the pickup optics and the data surface is the surface further removed from the pickup optics. In this manner, a disc may be prepared which could be used with either a CD or DVD player by having data for the corresponding player on the corresponding layer.

While there have been shown and described and pointed out the fundamental novel features of the invention as applied to preferred embodiments thereof, it will be understood that various omissions and substitutions and changes in the form and details of the device illustrated and in its operation may be made by those skilled in the art without departing from the spirit of the invention.

What is claimed is:

1. A multi data storage medium for data optically recorded in pit and land structures having data, a portion of which is readable by light of a first frequency, and not by light of a second frequency, and a portion of which data is readable by light of a second frequency and not the first frequency, comprising a first data surface formed as a series of pits and lands in a first plastic layer, a thin film of material forming a layer having upper and lower surfaces, said lower surface in contact with the pits and lands of said first data surface, wherein said film passes light of the second frequency and reflects light of the first frequency, an adhesive layer in contact with the upper surface of said thin film, said adhesive layer being transparent to light of the second frequency, a second plastic layer in contact with said adhesive, said second plastic layer having a second data surface comprising a series of pits and lands remote from said adhesive, a reflective layer for said second frequency of light in contact with the second data surface, wherein said thin film comprises a semiconducting material having a large index of refraction for reflectivity with a band gap energy of approximately 1.7 eV.

2. The multilayer data storage medium of claim 1, wherein said semiconducting material is a Ga stoichiometric semiconductor.

3. The multilayer data storage medium of claim 2 further comprising a partially reflective chromium layer between the plastic layer and the Ga semiconductor.

4. The multilayer data storage medium of claim 1, wherein said thin film comprises CdSe.

* * * * *